(12) United States Patent
Boehm et al.

(10) Patent No.: US 11,039,904 B2
(45) Date of Patent: Jun. 22, 2021

(54) DEVICE AND METHOD FOR HOLDING PROSTHETIC TEETH

(71) Applicant: Kulzer GmbH, Hanau (DE)

(72) Inventors: Uwe Boehm, Hanau (DE); Yohannes Woldegergis, Hanau (DE)

(73) Assignee: Kulzer GmbH, Hanau (DE)

( * ) Notice: Subject to any disclaimer, the term of this patent is extended or adjusted under 35 U.S.C. 154(b) by 401 days.

(21) Appl. No.: 15/779,112

(22) PCT Filed: Dec. 1, 2016

(86) PCT No.: PCT/EP2016/079493
§ 371 (c)(1),
(2) Date: May 25, 2018

(87) PCT Pub. No.: WO2017/093432
PCT Pub. Date: Jun. 8, 2017

(65) Prior Publication Data
US 2018/0344438 A1 Dec. 6, 2018

(30) Foreign Application Priority Data

Dec. 4, 2015 (DE) .......................... 102015121180.7

(51) Int. Cl.
*A61C 13/00* (2006.01)
*A61C 13/097* (2006.01)
(Continued)

(52) U.S. Cl.
CPC ...... *A61C 13/0004* (2013.01); *A61C 13/0001* (2013.01); *A61C 13/0006* (2013.01);
(Continued)

(58) Field of Classification Search
CPC ............ A61C 13/0001; A61C 13/0003; A61C 13/0004; A61C 13/0006; A61C 13/0019;
(Continued)

(56) References Cited

U.S. PATENT DOCUMENTS 9,295,534 B2 3/2016 Ruppert et al.
2007/0190492 A1* 8/2007 Schmitt .............. A61C 13/0004
433/213

(Continued)

FOREIGN PATENT DOCUMENTS

DE 102009056752 A1 6/2011
DE 102011101678 A1 11/2012
(Continued)

OTHER PUBLICATIONS

Search Report in International Application No. PCT/EP2016/079493 dated Feb. 8, 2017, 4 pages.

*Primary Examiner* — Jacqueline T Johanas
*Assistant Examiner* — Thomas Drew Agger
(74) *Attorney, Agent, or Firm* — Marshall, Gerstein & Borun LLP (57) ABSTRACT

A method for producing a dental prosthesis, and a dental prosthesis made according to the method, the method having the following chronological steps:
  a) producing a first, provisional dental prosthesis comprising a prosthetic base and provisional prosthetic teeth having occlusal surfaces, whereby data that indicate at least a 3-dimensional form of the occlusal surfaces are stored or have been stored as data record A,
  b) after subtractive occlusal processing of at least one of the provisional prosthetic teeth, determining at least the 3-dimensional occlusal surfaces of the processed provisional prosthetic teeth, or determining the 3-dimensional surface of the first dental prosthesis is determined as a whole,
  c) storing data that indicate at least a form of the 3-dimensional occlusal surfaces as data record B,
  d) calculating, via a computer comparison of data record B with data record A, differences in the forms of the
(Continued)

provisional prosthetic teeth before and after subtractive occlusal processing and, from this, calculating at least desired lengths for final prosthetic teeth, and e) producing said final prosthetic teeth at least with the calculated desired length using a CAM method from virtual models of the final prosthetic teeth, whereby the desired length is set by a basal shortening of the virtual models of the final prosthetic teeth, and the final prosthetic teeth produced in such a manner are firmly connected to the at least one first prosthetic base or at least one second prosthetic base.

24 Claims, 6 Drawing Sheets

(51) Int. Cl.
*A61C 13/107* (2006.01)
*A61C 13/34* (2006.01)

(52) U.S. Cl.
CPC ........ *A61C 13/097* (2013.01); *A61C 13/0019* (2013.01); *A61C 13/34* (2013.01)

(58) Field of Classification Search
CPC . A61C 13/0022; A61C 13/0024; A61C 13/08; A61C 13/097; A61C 13/34
USPC ...................................... 433/171, 201.1, 213
See application file for complete search history.

(56) References Cited

U.S. PATENT DOCUMENTS

| | | |
|---|---|---|
| 2012/0258430 A1 | 10/2012 | Ruppert et al. |
| 2013/0316302 A1* | 11/2013 | Fisker .................. A61C 8/0048 433/171 |
| 2013/0326878 A1* | 12/2013 | Boehm .................. B33Y 80/00 29/896.1 |
| 2014/0080095 A1* | 3/2014 | Suttin .................. A61C 9/0053 433/202.1 |
| 2014/0087327 A1 | 3/2014 | Noack |
| 2014/0255873 A1* | 9/2014 | Bullis .................. A61C 8/0048 433/199.1 |
| 2015/0066181 A1* | 3/2015 | Beyer ................ A61C 13/0019 700/98 |
| 2016/0193019 A1 | 7/2016 | Heinz et al. |
| 2016/0278893 A1 | 9/2016 | Savic et al. |
| 2017/0035538 A1 | 2/2017 | Savic et al. |

FOREIGN PATENT DOCUMENTS

| | | | |
|---|---|---|---|
| DE | 102013112747 A1 | 5/2015 | |
| DE | 102014105190 A1 | 10/2015 | |
| EP | 2742907 A1 | 6/2014 | |
| WO | WO-91/07141 A1 | 5/1991 | |
| WO | WO-2013/124452 A1 | 8/2013 | |
| WO | WO-2013124452 A1 * | 8/2013 | ......... A61C 13/1003 |
| WO | WO-2015/155283 A1 | 10/2015 | |

* cited by examiner

DEVICE AND METHOD FOR HOLDING PROSTHETIC TEETH

BACKGROUND OF THE INVENTION

Field of the Invention

The invention relates to a method for producing a dental prosthesis.

The invention also relates to a dental prosthesis produced with such a method.

The invention thus relates to the production of a dental prosthesis and the processing of prefabricated prosthetic teeth or the production of prosthetic teeth for partial and total dental plastic prostheses, which are produced mechanically using the CAM method (Computer-Aided Manufacturing), and constructed with the aid of a computer using the CAD method (Computer-Aided Design). The combination of such methods is known as the CAD/CAM method, in which both the construction and the production are achieved with the aid of a computer. The prosthetic teeth can be provided as a semi-finished product for the partial or full production of dental plastic prostheses using the CAM method, or produced entirely generatively (for example printed).

Related Technology

The current standard approach is the analog positioning of prosthetic teeth for producing dental prostheses, in which, first, an imprint of the toothless jaw of the patient is taken. From this imprint, a plaster model of the patient situation is created. Then, a functional model of the dental prosthesis is built up in wax on the plaster model and fitted with prosthetic teeth. This wax prosthesis is sent to the dentist for a trial fitting with the patient, during which the positions of the artificial prosthetic teeth can be corrected. This corrected arrangement is then returned to the laboratory, which then removes the wax base and transfers the arrangement of the artificial teeth into a final base made of plastic. For this purpose, a hollow mold or a casting mold is constructed from these two parts, in which the prosthetic teeth are already integrated. As a result, the prosthetic teeth are already inserted into the hollow mold and thus positioned. The mold is filled in with a gum-colored plastic, and during the pouring process, the prosthetic teeth are connected to the prosthetic base. After the plastic has hardened, it is post-processed in order to obtain the desired shape.

Finished prosthetic bases can be produced from a hardening plastic with an intermediate base made of wax. Here, after a trial fitting and any necessary adjustment and/or processing of the artificial prosthetic teeth a matrix is made of silicone or plaster in order to secure the position and alignment of the artificial prosthetic teeth. Afterwards, the wax base is removed, the hollow space that is created is usually filled with autopolymerizing material and the artificial prosthetic teeth are thus affixed onto or polymerized into the fixed prosthetic base. The dental prosthesis thus produced is adjusted on the patient during a trial fitting, and during this process, the occlusal sides of the prosthetic teeth are ground in some areas.

The entire above procedure is highly time- and therefore cost-intensive, and is based on a large number of steps involving manual skills. During the course of digitalization, the effort involved in producing, arranging and constructing the prosthetic bases and prosthetic teeth is being transferred to the CAD model, and the actual production is being taken over by machines (CAM machines).

When arranging prefabricated prosthetic teeth, these are adjusted to the mouth situation of the patient by the dental technician and ground. First methods are already available, such as the methods known from DE 10 2009 056 752 A1 or WO 2013 124 452 A1, in which the partial or total prosthesis is digitally arranged and produced via CAD/CAM methods. The problem of connecting and a subsequent correction is present in both standard and digital methods, however.

A CAD/CAM method for producing a dental prosthesis is known from WO 91/07141 A1, whereby with this method, a prosthetic base is milled on the basis of an imprint from a plastic block.

The disadvantage with the known methods is that the prosthetic teeth, when they are connected to the prosthetic base, are ground occlusally with a machining method in order to achieve the most precise fit possible of the dental prostheses in the mouth area of the patient. Thus, a correction to the arrangement and length of the teeth is frequently made by the dentist. Additionally, depending on the dental prosthesis, the position and/or the orientation of the prosthetic teeth in the prosthetic base can also be changed. In the case of printed, removable tooth replacement, this problem has not yet been solved. With each occlusal processing and shortening, the occlusal surface of the prosthetic teeth is impaired. Thus, unwanted roughened or even edged structures may occur, and with a layered structure of the prosthetic teeth, a weakening of the uppermost layer and thus of the mechanical stability of the prosthetic teeth may arise.

SUMMARY

The object of the invention is therefore to overcome the disadvantages of the prior art. In particular, a method and a dental prosthesis are to be provided in which no impairment of the occlusal sides of the prosthetic teeth occurs or is present. At the same time, the smallest possible number of post-processing steps should be necessary. The method should be realizable in the most low-cost and rapid manner, and the dental prosthesis should be producible at the lowest possible cost. Additionally, the post-processing of the prosthetic teeth should be realizable in the fastest manner and with the least possible effort. Additionally, modern, computer-controlled production methods should be executable with the method and the most extensive possible automation be achieved. Data and data recording devices already available should be used with the method according to the invention in the most profitable manner possible, or the fewest possible additional appliances and devices for implementing the method according to the invention should be required. At the same time, however, the precision with which it has been possible to produce and fit dental prostheses until now should remain intact.

The objects of the invention are attained by a method for producing a (final) dental prosthesis, featuring the following chronological method steps:

a) A first, provisional dental prosthesis comprising at least one first prosthetic base and several provisional prosthetic teeth is produced, whereby data that indicate at least the 3-dimensional form of the occlusal surfaces of the provisional prosthetic teeth of the provisional dental prosthesis are stored as data record A or have already been stored as data record A;

b) After subtractive occlusal processing of at least one of the provisional prosthetic teeth, at least the 3-dimensional occlusal surfaces of the processed provisional prosthetic teeth of the first dental prosthesis are determined, or the 3-dimensional surface of the first dental prosthesis is determined as a whole;

c) Data that indicate at least the 3-dimensional form of the occlusal surfaces of the processed provisional prosthetic teeth are stored as data record B;

d) Via a computer comparison of data record B with data record A, the differences in the forms of the provisional prosthetic teeth before and after the subtractive occlusal processing are calculated, and from this at least desired lengths for final prosthetic teeth are calculated; and e) Final prosthetic teeth are produced at least with the calculated desired length using a CAM method from virtual models of the final prosthetic teeth, whereby the desired length of the final prosthetic teeth is set by a basal shortening of the virtual models of the final prosthetic teeth, and the final prosthetic teeth, which have been produced in such a manner, are firmly connected to the at least one first prosthetic base or at least one second prosthetic base.

When stated below that at least the 3-dimensional occlusal surfaces of the provisional prosthetic teeth are stored, this should be understood such that data that indicate at least the 3-dimensional form of the occlusal surfaces of the provisional prosthetic teeth are stored. The data are preferably stored in digital form. According to the invention, data that indicate the at least 3-dimensional form of the occlusal surfaces of the provisional prosthetic teeth are also regarded as being data that lay a grid, including a rough grid, over the 3-dimensional surface of the prosthetic teeth or of the first dental prosthesis. The data can then be stored as Cartesian coordinates (X-, Y- and Z-coordinates). Here, preferably the vector is selected as the Z-coordinate that extends from the basal side to the occlusal side of the prosthetic tooth (the axis of the prosthetic teeth). However, it is also possible to store data records A and B with the aid of area functions which represent a 3-dimensional fit at least of the surface of one provisional prosthetic tooth respectively. Further, it is possible to store several stereo images directly uncompressed or compressed, and to only conduct computational processing of the stereo images when comparing data records A and B. Additional options of storing the data can be found by a person skilled in the art who is familiar with digital data processing.

When at least the 3-dimensional occlusal surfaces of the processed provisional prosthetic teeth of the first dental prosthesis are determined, this means that at least the 3-dimensional occlusal surfaces of the processed provisional prosthetic teeth of the first dental prosthesis are recorded and digitalized in some form, so that subsequently, an evaluation of the recorded 3-dimensional form can be carried out.

The length of the prosthetic teeth relates to the stretch or the distance between the occlusal and basal end of the prosthetic teeth. This applies both to the provisional prosthetic teeth and the physical final prosthetic teeth, as well as for the virtual models of the final prosthetic teeth.

The at least one first prosthetic base is according to the invention preferably a first prosthetic base for the upper jaw and a second first prosthetic base for the lower jaw. Accordingly, the at least one second prosthetic base is according to the invention preferably a first second prosthetic base for the upper jaw and a second second prosthetic base for the lower jaw. In a particularly preferred manner, the present invention namely relates to a method for producing total dental prostheses for the upper and lower jaw.

The data record A can for example already be present due to the fact that the provisional prosthetic teeth and if appropriate also the prosthetic base have been produced using a CAM method, whereby data are used for the purpose that contain the data record A or from which data record A can be derived.

Preferably, the first data record A is stored in step a) after the occlusal surfaces of the provisional prosthetic teeth have been recorded with a method that depicts the 3-dimensional surface and the image has been digitalized using a computational method. Here, an evaluation of the data can already be conducted and/or a selection of the data in order to create the data record A. Preferably, it can also be provided that at least the 3-dimensional occlusal surfaces of the provisional prosthetic teeth of the provisional dental prosthesis are determined and stored as data record A.

The data record A can also comprise data relating to the at least one first prosthetic base. Preferably, it can be provided that the data record A contains data relating to the 3-dimensional surface of the provisional dental prosthesis, or said data have been obtained through measurement and evaluation of the measurement, and the data thus obtained are stored.

With the method according to the invention it can be provided that in step e) the length of the virtual models of the final prosthetic teeth and/or the position and/or the position of the virtual models of the final prosthetic teeth in the final dental prosthesis to be produced are tested with the aid of a virtual articulator with regard to the occlusion of the final dental prosthesis to be produced, and preferably, the length of the virtual models of the final prosthetic teeth and/or the position and/or the location of the virtual models of the final prosthetic teeth in the at least one first prosthetic base are corrected and/or the forms of the final prosthetic teeth, in particular the basal forms of the final prosthetic teeth, are modified based on the test of the virtual articulator in such a manner that an improved occlusion of the virtual model of the final dental prosthesis in the virtual articulator is achieved.

As a result, it can be ensured that the final dental prosthesis has a high quality and fitting precision. Articulators are appliances for simulating the jaw joint movement. Virtual articulators accordingly conduct a computer simulation of the jaw joint movements on the basis of a virtual model of the dental prosthesis. The virtual articulator can therefore also be particularly beneficially used, since the data required for this purpose are available already, or are at least available to a large degree. Here, according to the invention, preferably not only the data relating to the 3-dimensional occlusal surface of the prosthetic teeth are used, but also data relating to the at least one first prosthetic base. With these data, the position, location and orientation of the prosthetic teeth can be determined, which is essential for testing using the virtual articulation. A better occlusion is self-explanatory to a person skilled in the art, whereby for this purpose, reference is made to the relevant literature.

According to a further development of the method according to the invention, it can also be provided that in steps b) and c), alongside the 3-dimensional occlusal surfaces, the positions of the processed provisional prosthetic teeth in the first prosthetic base are determined and stored as data record B2 and/or in steps b) and c), as well as the 3-dimensional occlusal surfaces, the orientations of the processed provisional prosthetic teeth in the first prosthetic base are determined and stored as data record B3, and in step d) using a computer comparison of the data record B2 with a data record A2, whereby in the data record A2 the positions of the non-processed provisional prosthetic teeth in the first dental prosthesis are stored, and/or using a computer comparison of the data record B3 with a data record A3, whereby in the data record A3 the orientations of the non-processed provisional prosthetic teeth are stored in the first dental prosthesis, the differences between the forms and the positions and/or orientations of the provisional prosthetic teeth are calculated before and after the subtractive occlusal processing, and from this desired forms and positions and/or orientations for final prosthetic teeth are calculated.

For this purpose, the provisional prosthetic teeth can to a limited degree be held movably in the at least one first prosthetic base, for example with the aid of a formable mass, which connects the provisional prosthetic teeth with the at least one prosthetic base.

Thus, a greater degree of variability of the method is achieved. However, here additional effort is required in order to precisely determine the position of the prosthetic teeth relative to the prosthetic base. For this purpose, according to the invention, markings can preferably be provided on the provisional prosthetic teeth, in particular on the outside surfaces of the provisional prosthetic teeth. As well as simple grinding of the prosthetic teeth, modifications to the position and/or orientation of the provisional prosthetic teeth can thus also be varied in the at least one prosthetic base and taken into account in the production of the final dental prosthesis.

It can be provided that the subtractive occlusal processing of at least one of the provisional prosthetic teeth is conducted during a fitting of the first, provisional dental prosthesis on the patient.

In this manner, it is achieved that the reaction and direct anatomy of the patient in relation to the first, provisional dental prosthesis is also incorporated into the production of the final dental prosthesis and thus a better result is achieved.

Preferably, it can further be provided that in step a) the data record A is generated via an imaging identification, in particular via scanning in with a scanner, at least of the 3-dimensional occlusal surfaces of the non-processed provisional prosthetic teeth of the first dental prosthesis or is generated via an imaging identification, in particular via scanning in with a scanner, of the 3-dimensional surface of the first dental prosthesis as a whole.

In this manner, the same method that is also used to generate the data of the data record B is also applied to generate the data record A and thus, deviations or some possible error sources are precluded. According to the invention, if appropriate, the data records A2 and A3 are preferably also generated in this manner.

With a further development according to the invention, it is additionally recommended that in step d), as well as calculating the desired lengths for the final prosthetic teeth, desired forms, orientations and/or positions for the final prosthetic teeth are also calculated.

In this manner, the advantages of the method according to the invention are extended to the forms, orientations and/or positions of the final prosthetic teeth in the at least one first prosthetic base or the at least one second prosthetic base.

Particularly advantageous methods can also stand out for the fact that in order to produce the first dental prosthesis in step a) in the mouth cavity of the patient, recorded data and/or data relating to articulation are used, whereby preferably, the first dental prosthesis is produced with a CAD/CAM method.

In this manner, it is ensured that the first, provisional dental prosthesis already has a very high quality, so that only slight changes, in other words, slight subtractive occlusal processing, have to be made on the provisional prosthetic teeth. In this way, it is achieved that a pure modification of the length of the prosthetic teeth, if appropriate while correcting with the virtual articulator, is sufficient in order to generate a high-quality final dental prosthesis.

It can advantageously also be provided that the at least one first prosthetic base is produced with a CAM method, preferably printed from plastic, particularly preferably printed from a plastic with a gum appearance.

As a result, the at least one first prosthetic base is also suitable for use as a final prosthetic base.

Additionally, it can be provided that the production of the final prosthetic teeth is achieved using a 3D printing method, through milling from a block with a CAM method or through basal shortening of prefabricated prosthetic teeth.

With these methods, the CAM method can be implemented particularly well. For example, for this purpose, a computer-controlled 4-axis mill for milling from a block or also for basal shortening of the prefabricated prosthetic teeth can be used.

Preferably, it can also be provided that the provisional prosthetic teeth are detachably connected to the at least one first prosthetic base, are preferably inserted into holding recesses in the at least one first prosthetic base and are held there in a press fit.

In this manner, the at least one first prosthetic base is also suitable for use as the at least one final prosthetic base, since the processed provisional prosthetic teeth can be detached from it without destroying the at least one first prosthetic base. Thus, deviations between the at least one first prosthetic base and the at least one final prosthetic base can be avoided.

In order to realize a method that is particularly easy to implement with less computing capacity required, it can be provided that the provisional prosthetic teeth are positioned in relation to their longitudinal axis with a precision of at least 200 µm with regard to the at least one first prosthetic base in the first provisional dental prosthesis, preferably with a precision of at least 100 µm, particularly preferably with a precision of at least 20 µm.

The longitudinal axis corresponds to the Z-axis of the prosthetic teeth, which extends from the basal end of the prosthetic teeth up to the occlusal end of the prosthetic teeth.

In this manner, it is ensured that no serious deviations occur between the position of the prosthetic teeth in the at least one first prosthetic base and the position of the final prosthetic teeth in the at least one final prosthetic base.

Preferably, it can further be provided that in step a) each of the provisional prosthetic teeth of the first dental prosthesis is connected to one of the at least one first prosthetic base, preferably inserted into one of the at least one first prosthetic base, particularly preferably in a press fit.

In this manner, the precise structure of the first, provisional dental prosthesis is clarified and the detachability of the provisional prosthetic teeth is achieved.

The objects that form the basis of the present invention are also attained by means of a dental prosthesis produced with a method according to the invention.

The invention is based on the surprising finding that through the use of provisional prosthetic teeth in a first, provisional dental prosthesis, which is however already produced to a high quality level and which can already contain the at least one final prosthetic base, together with known scanning methods and computer-aided CAD methods that are anyway used with modern methods in the same or a similar manner, it is possible to achieve a well-fitting final dental prosthesis in which the prosthetic teeth on the occlusal side have not be subsequently processed or at least must only be processed to a low degree occlusally. At the same time, the final dental prosthesis thus produced has the high quality of a standard prosthesis adjusted by the dentist. This is achieved above all by the fact that an occlusal processing of the provisional prosthetic teeth is measured by comparing the 3-dimensional occlusal surfaces before and after processing, and is converted into a basal shortening or basal processing of the final prosthetic teeth. As a result, the occlusal processing of the provisional prosthetic teeth previously performed is converted into an uncritical basal processing or shortening of the prosthetic teeth.

Following the allegedly optimal basal shortening of the prosthetic teeth, there has to date been no possibility of correcting the length of the teeth on the Z-axis without processing the occlusal sides of the prosthetic teeth.

The idea on which the present invention is based can here be understood as follows. A prosthetic base is printed with a pink appearance. This can already be in the final desired quality. Then, shorted provisional prosthetic teeth are connected in try-in quality (low-cost) or in final quality as a prosthetic tooth strip or also individually connected to the prosthetic base by a press fit or similar. The fitting on the Z-axis should here preferably be as precise as possible, as far as possible to a degree of precision of 200 µm or better. The provisional prosthetic tooth strip or the provisional prosthetic teeth can be printed or otherwise produced.

This first, provisional dental prosthesis is sent to the practice. There, a manual correction is made with a machining method, such as grinding, milling or similar.

The altered model, i.e. the altered first dental prosthesis, is now scanned again. The occlusal alteration to the provisional prosthetic teeth on the Z-axis is now basally implemented, however, with the newly produced final prosthetic teeth. A digital inspection and if appropriate a digital optimization of the occlusion can be conducted again in advance, preferably with the aid of a virtual articulator.

BRIEF DESCRIPTION OF THE DRAWINGS

Below, exemplary embodiments of the invention will be explained with reference to six schematically shown figures, although without limiting the invention, in which.

In the figures, in some cases, the same reference numerals are also used for similar parts and areas with different embodiments. With all profile views, profiled areas are shown as shaded.

DETAILED DESCRIPTION

Figure 1:
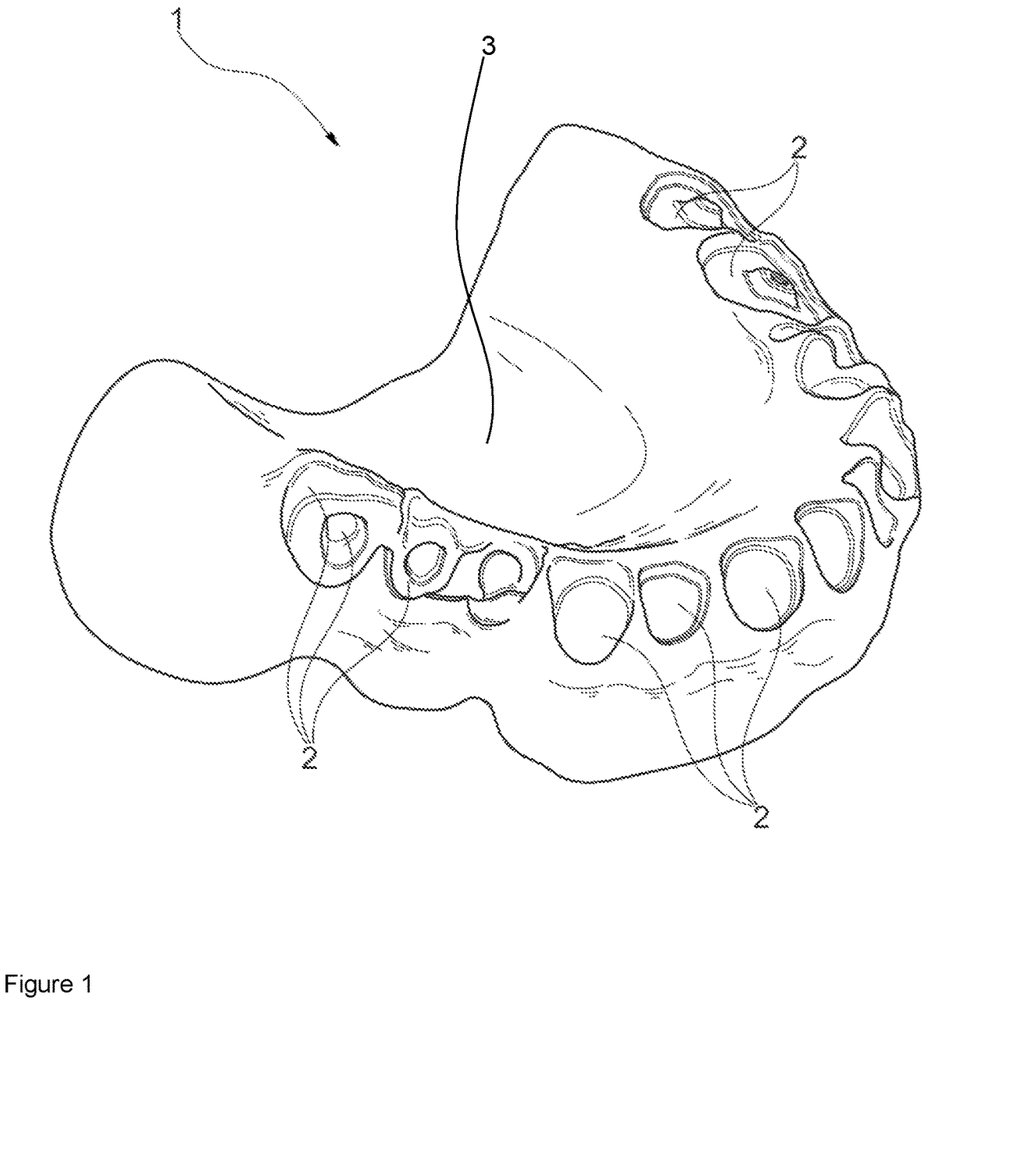
FIG. 1: shows a schematic perspective view of a prosthetic base.

FIG. 1 shows a schematic perspective view of a prosthetic base 1. The prosthetic base 1 consists of a pink-colored dyed plastic. The coloration and transparency is chosen to match the gum appearance. In the upper side of the prosthetic base 1, a palatal plate 3, and a plurality of surfaces 2 are provided to affix prosthetic teeth (not shown in FIG. 1).

Figure 2:
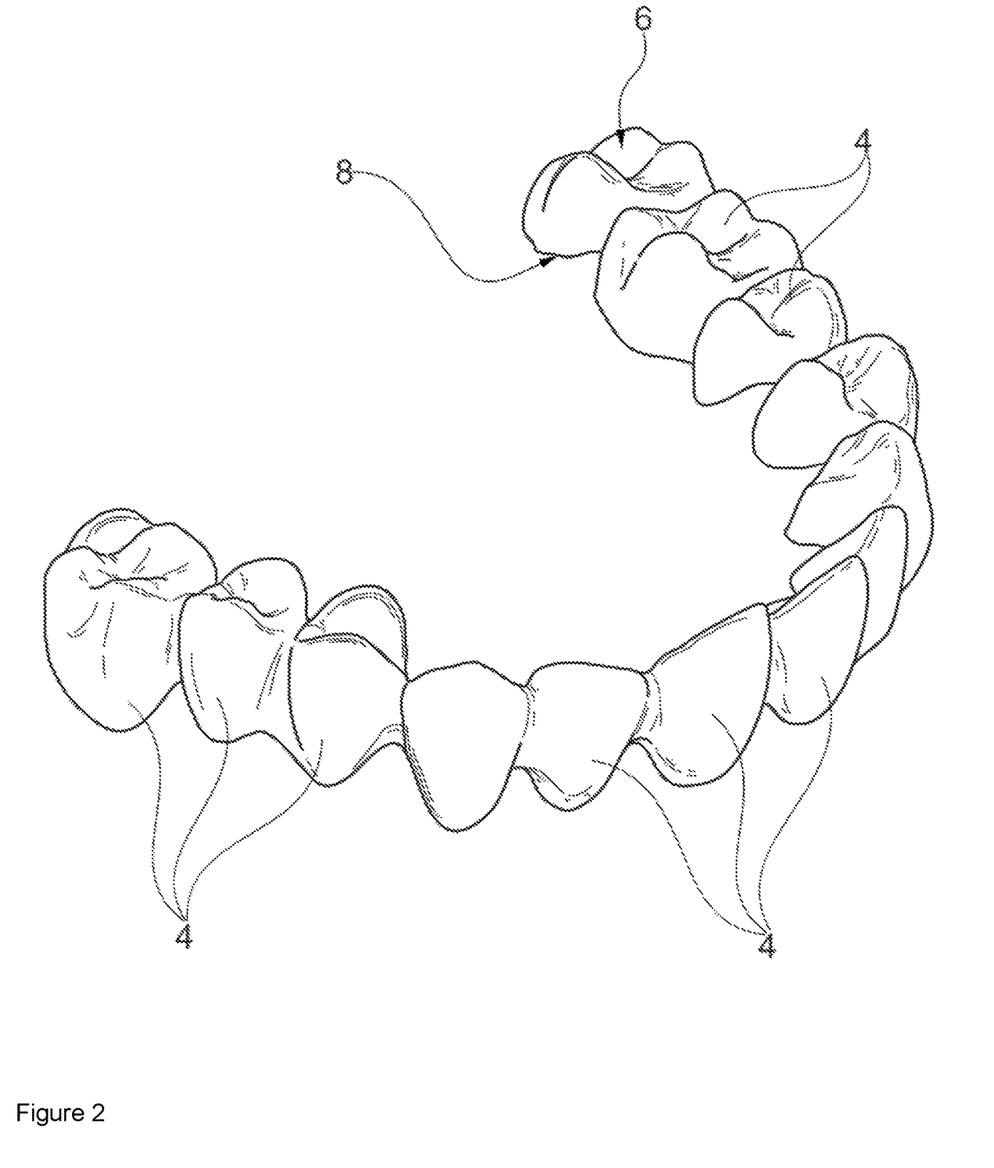
FIG. 2: shows a schematic perspective view of a set of provisional prosthetic teeth.

FIG. 2 shows a perspective view of a set of provisional prosthetic teeth 4 for implementing a method according to the invention, which are provided for insertion into the prosthetic base according to FIG. 1. It should be noted that the provisional prosthetic teeth 4 can be present both as a continuous row of teeth, as is shown in FIG. 2, and individually, and then not connected to each other. However, the method is also realizable with rows of teeth of provisional prosthetic teeth 4 that are connected to each other, which are connected to each other in groups.

The provisional prosthetic teeth 4 preferably consist of a white plastic. Each provisional prosthetic tooth 4 has an occlusal surface 6 (chewing surface) and a basal surface 8. The basal surface 8 is detachably affixed in the prosthetic base 1 through press fitting in the recesses formed by the surfaces 2. The surfaces 2 can have indexing, so that the provisional prosthetic teeth 4 can only be inserted in a particular orientation in the prosthetic base 1 and each provisional prosthetic tooth 4 only matches precisely one surface 2. When using provisional rows of teeth, in particular when they are designed to be connected to each other as a row of teeth, this is initially not absolutely necessary, but when affixing the final prosthetic teeth (not shown in FIGS. 1 and 2) which are later present individually, it can be helpful and advantageous for producing the final dental prosthesis. An indexing must if appropriate later remain intact with a basal shortening of the final prosthetic teeth (see FIG. 5), so that the final prosthetic teeth can be correctly inserted into the prosthetic base 1.

The surfaces 2 match the basal counterpieces on the basal side 8 of the provisional prosthetic teeth 4, so that the provisional prosthetic teeth 4 can be inserted into the recesses formed by the surfaces 2 and held there via press fitting.

According to an alternative embodiment, it can also be provided that prior to the first insertion of the provisional prosthetic teeth 4 onto the surfaces 2 into the prosthetic base 1, a thin, defined wax layer (not shown) is applied onto the basal side 8 of the provisional prosthetic teeth 4 and/or the surfaces 2 for affixing the provisional prosthetic teeth 4 that are applied in the prosthetic base 1. The wax layer is then arranged between the prosthetic base 1 and the provisional prosthetic teeth 4 following insertion of the provisional prosthetic teeth 4. As a result, the inserted provisional prosthetic teeth 4 in the prosthetic base 1 are slightly movable and thus enable the dentist or the user to make a certain correction of the position and orientation of the provisional prosthetic teeth 4 in the prosthetic base 1. As a result, the positions and the orientations of the provisional prosthetic teeth 4 in the prosthetic base 1 can be adapted to the needs of a patient for whom the final dental prosthesis to be produced is determined. The wax must if necessary be removed before the insertion of final prosthetic teeth if a new prosthetic base is not connected to the final prosthetic teeth in order to obtain the final dental prosthesis.

According to the invention, however, it is preferred that the provisional prosthetic teeth 4 sit firmly in the press fit in the surfaces 2 of the prosthetic base 1 and are only processed by grinding or milling on the occlusal side 6. As a result, it can be ensured that the positions of the provisional prosthetic teeth 4, in particular on the Z-axis (the distance vector between the occlusal end 6 and the basal end 8 of the provisional prosthetic teeth 4), is very precisely set. In order to design the later scanning method as simply as possible, the position of the provisional prosthetic teeth 4 in the surfaces 2 of the prosthetic base 1 should namely be set to a degree of precision of at least 200 μm, preferably at least 100 μm. Otherwise, the positions and orientations of the provisional prosthetic teeth 4 are namely recognized, although they are processed on the occlusal side 6. For this purpose, according to the invention, markings (not shown) can be arranged on the side areas of the provisional prosthetic teeth 4, which permits and as a result at least simplifies a detection of the position and orientation of the provisional prosthetic teeth 4 relative to the prosthetic base 1.

Figure 3:
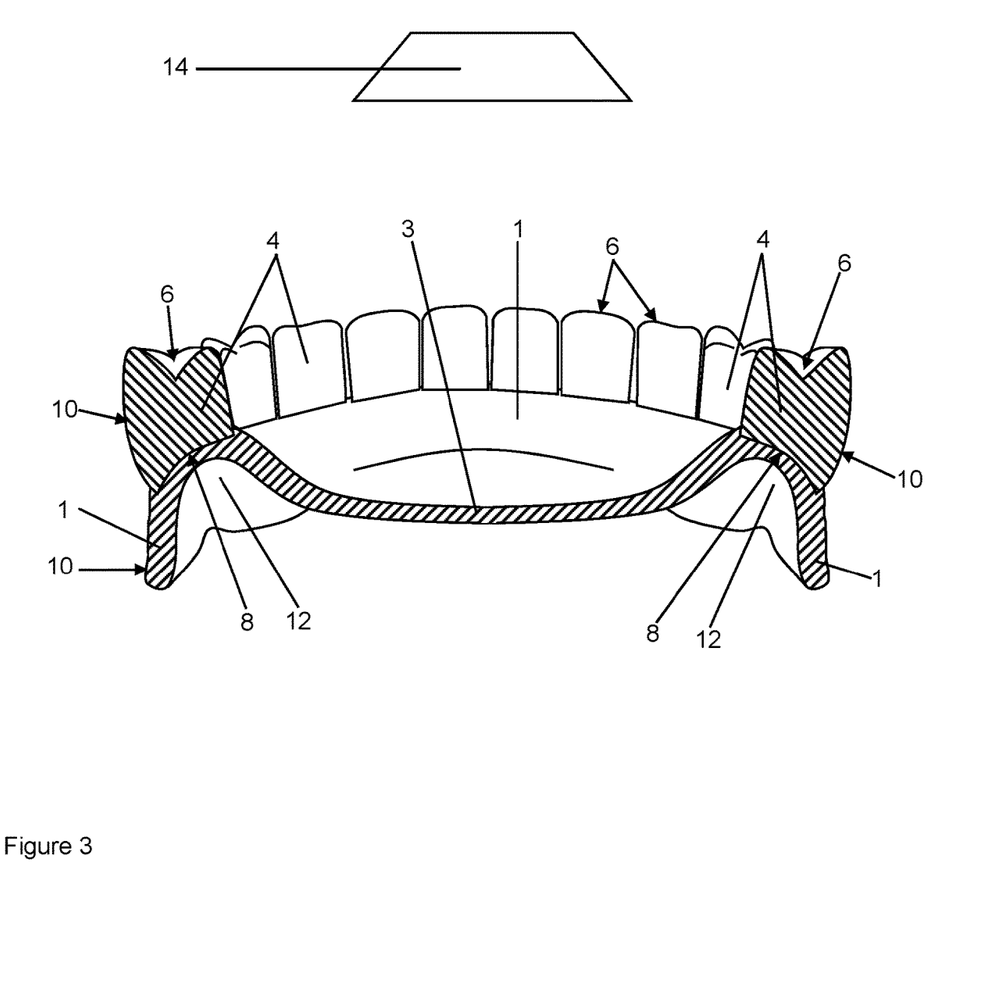
FIG. 3: shows a schematic profile view of a first, provisional dental prosthesis before processing.

FIG. 3 shows a schematic profile view of a first, provisional dental prosthesis before processing. The first, provisional dental prosthesis consists of the prosthetic base 1 and the provisional prosthetic teeth 4 inserted into the prosthetic base 1. On side encasement surfaces 10 of the provisional prosthetic teeth 4, markings (not shown) can be arranged which enable a recognition of each provisional prosthetic tooth 4 and a determination of the position and orientation of the provisional prosthetic teeth 4 relative to the prosthetic base 1. This is not necessary when the position and orientation of the provisional prosthetic teeth 4 is determined by a precise execution of the provisional prosthetic teeth 4 and the prosthetic base 1 and the connection between them.

On the lower side of the prosthetic base 1, there is a bed as a contact surface 12 for the jaw arc of the patient. The precise form of the contact surface 12 is preferably created with the aid of CAD/CAM methods and an intra-oral scan on the patient. Equally preferred, the arrangement of the surfaces 2 and the selection and form of the provisional prosthetic teeth 4 is calculated with a CAD/CAM method and a virtual articulator, and here both the provisional prosthetic teeth 4 and the prosthetic base 1 are produced with a CAM method based on calculated and optimized CAD models.

The 3-dimensional surface of the first, provisional dental prosthesis according to FIG. 3 can be scanned in with a scanner 14 in a defined position of the first dental prosthesis from the occlusal side 6 or from several sides, and the data thus obtained can be stored in an electronic storage device (not shown) of a computer (not shown) as data record A. It can also be sufficient only to scan in the occlusal sides 6 of the provisional prosthetic teeth 4 and to store them as data record A, or to scan in the occlusal sides 6 and the encasement surfaces 10 of the provisional prosthetic teeth 4 and a place on the prosthetic base 1, and to store them as data record A containing the data records A2 and A3. It is further also possible to not conduct a scan and only to use the information that is used to produce the first, provisional dental prosthesis with CAD/CAM methods, and from it to derive and store data record A, if appropriate comprising at least one of data records A2 and A3.

The first, provisional dental prosthesis is then sent to a dentist, who fits the first dental prosthesis on the patient and, while doing so, grinds or mills several of the provisional prosthetic teeth on the occlusal side 6, in order to increase the occlusion and the wearing comfort of the first dental prosthesis. Then, the first dental prosthesis thus processed is sent back to the laboratory.

Figure 4:
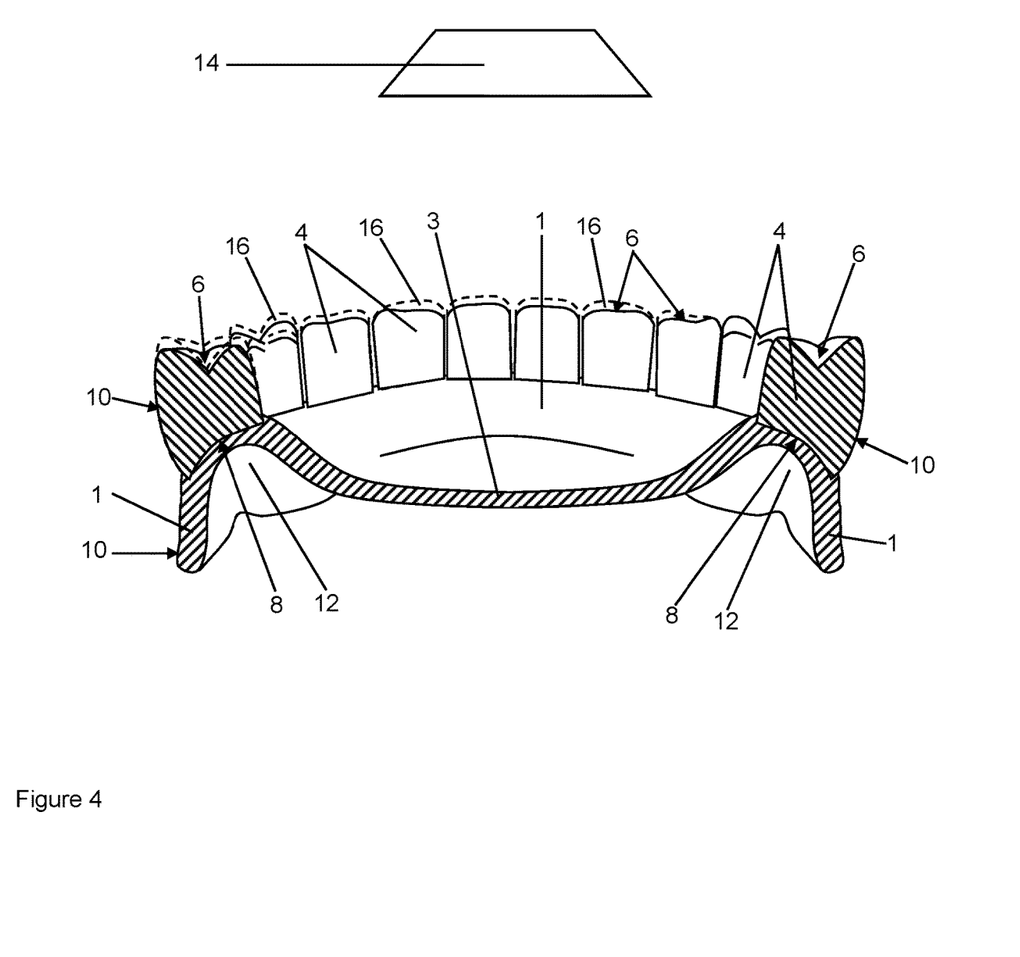
FIG. 4: shows a schematic profile view of the first, provisional dental prosthesis following subtractive occlusal processing.

FIG. 4 shows a schematic profile view of the first, provisional dental prosthesis following subtractive occlusal processing by the dentist. In order to visualize the processing, in FIG. 4, in the area of the occlusal sides 6 of the processed provisional prosthetic teeth 4, the form of the original, non-processed, occlusal side is identified by a broken line. In FIG. 4, it can be seen that with the present example, not all provisional prosthetic teeth 4 have been processed occlusally. However, all provisional prosthetic teeth 4 can also be processed.

With the aid of the scanner 14, the 3-dimensional surface of the processed first dental prosthesis is recorded and digitalized. Alternatively, only the occlusal sides 6 of the processed provisional prosthetic teeth 4 or the occlusal sides 6 and the encasement surfaces 10 of the processed provisional prosthetic teeth 4 are recorded together with a point of the prosthetic base 1. The data thus obtained are stored in the electronic storage device of the computer as data record B, if necessary comprising at least one of the data records B2 and B3. Then, with the aid of the computer, a computer comparison of the data records A and B or A2 and B2 and/or A3 and B3 is made. From this, an occlusal height difference 16 or an occlusal differential volume body 16 is calculated which corresponds to the part of the provisional prosthetic teeth 4 removed by the dentist.

As can be seen in FIG. 4, here, not all provisional prosthetic teeth 4 must have been processed. With the exemplary processing shown in FIG. 4, two of the provisional prosthetic teeth 4 (shown in the Figure on the right-hand side) have not been processed or have not been shortened on the occlusal side 6. It is clear that the quantity of removed volumes 16 is shown exaggeratedly to clarify the principle according to the invention in FIG. 4.

Figure 5:
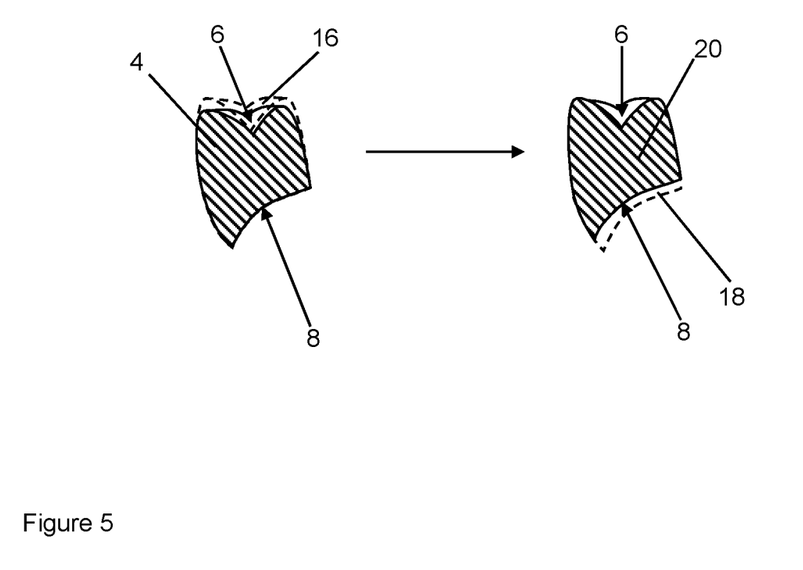
FIG. 5: shows a schematic view of a transfer according to the invention of the occlusal height difference of processed provisional prosthetic teeth onto a basal height difference of final prosthetic teeth.

For this purpose, FIG. 5 shows a schematic view of a transfer according to the invention of the occlusal height difference 16 of processed provisional prosthetic teeth 4 onto a basal height difference 18 of final prosthetic teeth 20. The final prosthetic teeth 20 consist of a hard, white plastic with a coloration and transparency that matches teeth or the teeth of a patient. From the occlusal height difference 16 or the occlusal differential volume body 16, according to the invention a basal height difference 18 or a basal differential volume body 18 is calculated, so that the final prosthetic teeth 20, when they are inserted in the surfaces 2 of the prosthetic base 1, have the occlusal profile specified by the processed first dental prosthesis, without the occlusal sides 6 of the final prosthetic teeth 20 having to have been processed to this end. For this purpose, the basal sides 8 of the virtual CAD models for the production of the final prosthetic teeth 20 are basally shortened, whereby a calculation is made for the form and scope of the shortening in which it is simulated which basal shortening of the final prosthetic teeth 20 produces a form that leads to the desired height profile of the occlusal sides 6 of the processed provisional prosthetic teeth 4 in the prosthetic base 1.

The final prosthetic teeth 20 thus calculated are produced using a CAM method (for example printed out), or prefabricated prosthetic teeth (not shown) are basally shortened accordingly with the aid of a computer-controlled 4-axis mill with a CAM method. Alterations to the occlusal sides 6 that cannot be set through basal shortening can be easily implemented with generative production methods for producing the final prosthetic teeth 20. When using prefabricated prosthetic teeth, matching prefabricated prosthetic teeth can be selected accordingly.

When the provisional prosthetic teeth 4 are movably arranged in the prosthetic base 1, the altered alignment (orientation) and positioning of the provisional prosthetic teeth 4 can be recorded and stored with the scan. From this a suitable basal form of the final prosthetic teeth 20 can be calculated with a CAD method and implemented with the CAM method.

The processed provisional prosthetic teeth 4 are removed from the prosthetic base 1 and, in their place, the final prosthetic teeth 20 which have been produced or processed with the CAM method are glued into the prosthetic base 1. If desired, a new prosthetic base 1 can also be produced (or printed out) in order to thus produce the final finished dental prosthesis with the final prosthetic teeth 20.

Figure 6:
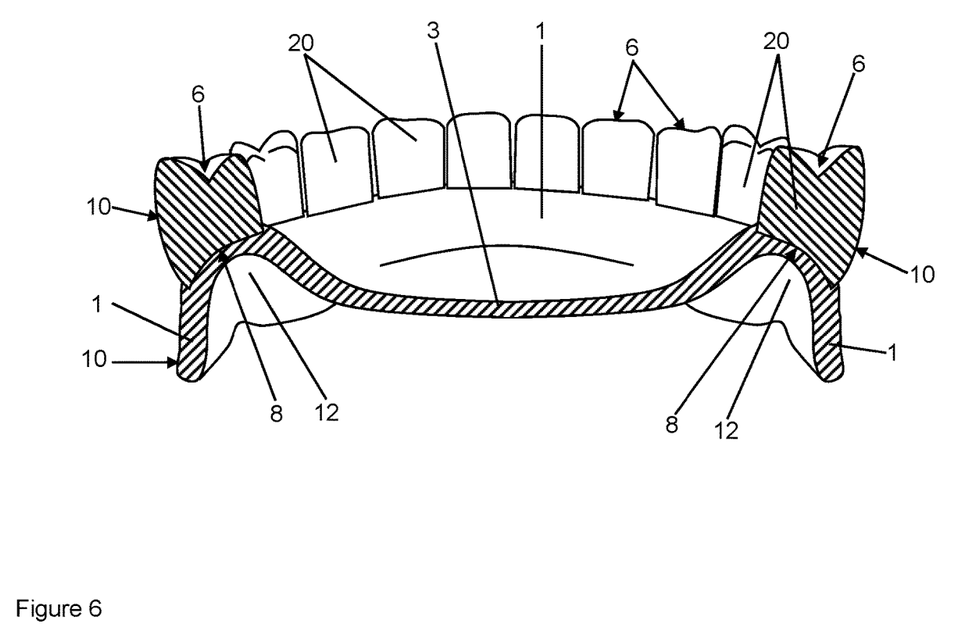
FIG. 6: shows a schematic profile view of a final dental prosthesis, which has been produced with a method according to the invention.

FIG. 6 shows a schematic profile view of such a final dental prosthesis, which has been produced with a method according to the invention. The final prosthetic teeth 20 with the basal side 8 of the prosthetic teeth 4 have been glued into the cavities 2 of the prosthetic base 1. The occlusal sides 6 of the final prosthetic teeth 20 remain unprocessed, so that the material on the occlusal side 6 is not impaired and thus has an optimal stability and durability. This final dental prosthesis produced with the method according to the invention does not in normal cases require post-processing, or only requires a low degree of post-processing. The encasement surfaces 10 of the final prosthetic teeth 20 naturally have no markings.

Alongside the prosthetic base 1 shown, preferably, with a complete total dental prosthesis, a second prosthetic base can be used fitted with prosthetic teeth 4, 20. One prosthetic base is then provided for the upper jaw and another for the lower jaw. Here, only one prosthetic base 1 is assumed in order to simplify the discussion, whereby for a person skilled in the art, the transfer of the above to a second prosthetic base is simple and possible without great effort.

The features of the invention disclosed in the above description, as well as in the claims, figures and exemplary embodiments, can be essential either individually or in any combination required for the realization of the invention in its different embodiments.

LIST OF REFERENCE NUMERALS

1 Prosthetic base
2 Holding surface
3 Palatal plate
4 Provisional prosthetic tooth
6 Occlusal surface
8 Basal surface
10 Encasement surface
12 Contact surface for jaw arc
14 Scanner
16 Occlusal height difference
18 Basal height difference
20 Final prosthetic tooth

The invention claimed is:

1. A method for producing a dental prosthesis comprising the following chronological method steps:
  a) producing a first, provisional dental prosthesis comprising at least one first prosthetic base and several provisional prosthetic teeth, whereby data that indicate at least a 3-dimensional form of occlusal surfaces of the provisional prosthetic teeth of the provisional dental prosthesis are stored as data record A or have already been stored as data record A;
  b) subtractive occlusal processing at least one of the provisional prosthetic teeth wherein basal sides of the provisional prosthetic teeth remain unprocessed, and then determining at least the 3-dimensional occlusal surfaces of the processed provisional prosthetic teeth of the first dental prosthesis, or determining a 3-dimensional surface of the first dental prosthesis as a whole;
  c) storing data that indicate at least one said 3-dimensional form of the occlusal surfaces of the processed provisional prosthetic teeth as data record B;
  d) calculating, via a computer comparison of data record B with data record A, differences in the forms of the provisional prosthetic teeth before and after the subtractive occlusal processing and, from this, calculating at least desired lengths for final prosthetic teeth; and
  e) producing said final prosthetic teeth at least with the calculated desired length using a CAM method from virtual models of the final prosthetic teeth, whereby the desired length of the final prosthetic teeth is set by a basal shortening of the virtual models of the final prosthetic teeth wherein occlusal sides of the virtual models remain unprocessed before connecting the final prosthetic teeth to the at least on first prosthetic base or at least one second prosthetic base, and firmly connecting the final prosthetic teeth, which have been produced in such a manner, to the at least one first prosthetic base or the at least one second prosthetic base.

2. The method according to claim 1 comprising testing in step e) the desired lengths of the virtual models of the final prosthetic teeth and/or a position and/or a location of the virtual models of the final prosthetic teeth in a final dental prosthesis to be produced aided by a virtual articulator with regard to an occlusion of the final dental prosthesis to be produced.

3. The method according to claim 1, comprising determining and storing in steps b) and c), alongside the 3-dimensional occlusal surfaces, positions of the processed provisional prosthetic teeth in the first prosthetic base as data record B2 and/or determining and storing in steps b) and c), as well as the 3-dimensional occlusal surfaces, orientations of the processed provisional prosthetic teeth in the first prosthetic base as data record B3, and
  in step d) using a computer comparison of the data record B2 with a data record A2, whereby in the data record A2 the positions of the non-processed provisional prosthetic teeth in the first dental prosthesis are stored, and/or using a computer comparison of the data record B3 with a data record A3, whereby in the data record A3 the orientations of the non-processed provisional prosthetic teeth are stored in the first dental prosthesis, calculating the differences between the forms and the positions and/or orientations of the provisional prosthetic teeth before and after the subtractive occlusal processing and, from this, calculating desired forms and positions and/or orientations for final prosthetic teeth.

4. The method according to claim 1, comprising conducting the subtractive occlusal processing of at least one of the provisional prosthetic teeth during a fitting of the first, provisional dental prosthesis on the patient.

5. The method according to claim 1, comprising generating in step a) the data record A via an imaging identification, at least the 3-dimensional form of the occlusal surfaces of the non-processed provisional prosthetic teeth of the first provisional dental prosthesis or generating via an imaging identification, a 3-dimensional surface of the first dental prosthesis as a whole.

6. The method according to claim 1, comprising calculating in step d), the desired lengths for the final prosthetic teeth, and desired forms, orientations and/or positions for the final prosthetic teeth.

7. The method according to claim 1, comprising using, to produce the first provisional dental prosthesis in step a), data recorded in the mouth cavity of the patient, data recorded on a model of the mouth cavity and/or data relating to articulation.

8. The method according to claim 1, comprising producing the at least one first prosthetic base with a CAM method.

9. The method according to claim 1, comprising producing the final prosthetic teeth using a 3D printing method, through milling from a block with a CAM method or through basal shortening of prefabricated prosthetic teeth.

10. The method according to claim 1, comprising detachably connecting the provisional prosthetic teeth to the at least one first prosthetic base.

11. The method according to claim 1, comprising positioning the provisional prosthetic teeth in relation to their longitudinal axis with a precision of at least 200 µm with regard to the at least one first prosthetic base in the first provisional dental prosthesis.

12. The method according to claim 1, comprising in step a), connecting each of the provisional prosthetic teeth of the first dental prosthesis to one of the at least one first prosthetic base.

13. A dental prosthesis produced with a method according to claim 1.

14. The method according to claim 2, comprising correcting the desired lengths of the virtual models of the final prosthetic teeth and/or the position and/or the location of the virtual models of the final prosthetic teeth in the at least one first prosthetic base and/or modifying the forms of the final prosthetic teeth based on the test of the virtual articulator in such a manner that an improved occlusion of the virtual model of the final dental prosthesis in the virtual articulator is achieved.

15. The method according to claim 14, comprising modifying basal forms of the final prosthetic teeth.

16. The method according to claim 5, comprising generating in step a) the data record A via an imaging identification, by scanning in with a scanner, at least the 3-dimensional form of the occlusal surfaces of the provisional prosthetic teeth of the first dental prosthesis or generating via an imaging identification, by scanning in with a scanner, the 3-dimensional surface of the first provisional dental prosthesis as a whole.

17. The method according to claim 7, comprising producing the first provisional dental prosthesis in step a) with a CAD/CAM method.

18. The method according to claim 8, comprising printing the at least one first prosthetic base with a CAM method from plastic.

19. The method according to claim 18, comprising printing the at least one first prosthetic base with a CAM method from a plastic with a gum appearance.

20. The method according to claim 10, comprising detachably connecting the provisional prosthetic teeth to the at least one first prosthetic base, by inserting into holding recesses in the at least one first prosthetic base such that the provisional prosthetic teeth are held in the holding recesses in a press fit.

21. The method according to claim 11, comprising positioning the provisional prosthetic teeth in relation to their longitudinal axis with a precision of at least 100 µm with regard to the at least one first prosthetic base in the first provisional dental prosthesis.

22. The method according to claim 21, comprising positioning the provisional prosthetic teeth in relation to their longitudinal axis with a precision of at least 20 µm with regard to the at least one first prosthetic base in the first provisional dental prosthesis.

23. The method according to claim 12, comprising in step a), connecting each of the provisional prosthetic teeth of the first dental prosthesis to one of the at least one first prosthetic base by inserting into one of the at least one first prosthetic base.

24. The method according to claim 23, comprising in step a), connecting each of the provisional prosthetic teeth of the first dental prosthesis to one of the at least one first prosthetic base by inserting into one of the at least one first prosthetic base in a press fit.

* * * * *